(12) United States Patent
Moroney et al.

(10) Patent No.: US 8,949,592 B2
(45) Date of Patent: Feb. 3, 2015

(54) SYSTEM AND METHODS FOR PROVIDING LIVE STREAMING CONTENT USING DIGITAL RIGHTS MANAGEMENT-BASED KEY MANAGEMENT

(75) Inventors: Paul Moroney, La Jolla, CA (US); Rafie Shamsaasef, San Diego, CA (US)

(73) Assignee: Google Technology Holdings, Mountain View, CA (US)

( * ) Notice: Subject to any disclaimer, the term of this patent is extended or adjusted under 35 U.S.C. 154(b) by 214 days.

(21) Appl. No.: 13/429,266

(22) Filed: Mar. 23, 2012

(65) Prior Publication Data

US 2012/0246462 A1 Sep. 27, 2012

Related U.S. Application Data

(60) Provisional application No. 61/466,630, filed on Mar. 23, 2011.

(51) Int. Cl.
*H04L 29/06* (2006.01)
(52) U.S. Cl.
CPC ............ *H04L 63/10* (2013.01); *H04L 65/4084* (2013.01); *H04L 65/602* (2013.01); *H04L 63/04* (2013.01); *H04L 63/06* (2013.01); *H04L 2463/101* (2013.01)
USPC ....................................................... 713/151
(58) Field of Classification Search
CPC .......... G06F 15/16; H04N 7/173; H04N 7/16; H04L 29/06

USPC .......................................................... 713/151
See application file for complete search history.

(56) References Cited

U.S. PATENT DOCUMENTS

| | | | |
|---|---|---|---|
| 7,769,880 B2* | 8/2010 | Paka et al. ..................... | 709/231 |
| 2007/0162753 A1* | 7/2007 | Nakano et al. ................ | 713/171 |
| 2007/0283167 A1* | 12/2007 | Venters et al. ................ | 713/189 |
| 2010/0169303 A1 | 7/2010 | Biderman et al. | |
| 2010/0280953 A1* | 11/2010 | Kitazato ........................ | 705/59 |

FOREIGN PATENT DOCUMENTS

EP 2475149 A2 11/2012

OTHER PUBLICATIONS

PCT Search Report and Written Opinion, RE: Application #PCT/US2012/030469; Aug. 6, 2012.
Pantos, R., et al., "HTTP Live Streaming," Standard Working Draft, Engineering Task Force, IEFT, http://tools.ietf.org/html/draft-pantos-http-live-streaming-05, Nov. 19, 2010, 22 pages, Internet Society (ISOC).

* cited by examiner

*Primary Examiner* — Tu Nguyen
(74) *Attorney, Agent, or Firm* — Amin, Turocy & Watson, LLP

(57) ABSTRACT

In the present disclosure, a DRM (in this case IPRM) system may be used to deliver media content keys to a player device in a live streaming environment and take advantage of all DRM related functionalities that come with it, such as proximity control, copy protection enforcement and rights verification. A playlist may be used to deliver a key identifier for encrypted live streaming content.

19 Claims, 9 Drawing Sheets

SYSTEM AND METHODS FOR PROVIDING LIVE STREAMING CONTENT USING DIGITAL RIGHTS MANAGEMENT-BASED KEY MANAGEMENT

STATEMENT OF RELATED APPLICATIONS

This application claims the benefit of U.S. Provisional Patent Application Ser. No. 61/466,630, filed Mar. 23, 2011, which is incorporated herein in its entirety.

BACKGROUND

HyperText Transfer Protocol (HTTP) Live Streaming (also known as HLS) is an HTTP-based media streaming communications protocol. It works by breaking the overall stream into a sequence of small HTTP-based file downloads, each download loading one short chunk of an overall potentially unbounded transport stream. As the stream is played, the client may select from a number of different alternate streams containing the same material encoded at a variety of data rates, allowing the streaming session to adapt to the available data rate. At the start of the streaming session, it downloads an extended M3U playlist containing the metadata for the various sub-streams which are available.

In a typical live streaming scheme, the content key that is used to decrypt the media content on the player device is delivered over secure HTTP (HTTPS), which is a combination of HTTP with Secure Sockets Layer (SSL), a cryptographic protocol that provides communication security over the internet.

Most Digital Rights Management (DRM) systems provide services such as proximity checking or copy protection enforcement that go beyond what is provided by SSL. HTTPS is deemed not to be effective enough to implement live streaming in a DRM-based system. Therefore, the above problem calls for a DRM-based system to securely deliver media content keys to player devices.

SUMMARY

Disclosed is a method for providing live streaming content using DRM based key management via a server device. In one embodiment, live streaming content is encrypted using a key established by DRM-based key management. The encrypted content is segmented. A uniform resource identifier (URI) of a DRM-based live streaming content key is created. The URI indicates usage of a DRM key management protocol. The URI is sent to a client device in a playlist. The encrypted content is sent to the client device.

The playlist is sent to an application of the client device. When Advanced Encryption Standard 128 bit Cypher Block Chaining (AES-128 CBC) encryption is used, the encrypted content is sent to a media player of the client device. When Advanced Encryption Standard 128 bit Electronic Code Book (AES-128 ECB) MPEG-2 Transport Stream (MP2TS) encryption is used, the encrypted content is sent to the application of the client device.

In one embodiment, a channel change request from a client device is received and processed. A new DRM-based live streaming content key is derived. The live streaming content is transcoded and encrypted using the DRM-based live streaming content key.

A channel change request from the client is received and processed. Content copy control information (CCI) is monitored to listen for changes. New CCI data is obtained. A new key is generated based in part on the change in CCI. Live streaming content is transcoded and encrypted using the new DRM-based live streaming content key.

In one embodiment, deriving the DRM-based live streaming content key further involves creating a rights data file and storing a subkey used to derive the DRM-based live streaming content key. In one embodiment, the URI provides a reference to the DRM-based live streaming content key.

In one embodiment, a change in a detected parameter is determined while currently tuned to a channel and using the DRM-based live streaming content key. A new DRM-based live streaming content key is derived is response to the detected parameter. Live streaming content is transcoded and encrypted using the new DRM-based live streaming content key. The encrypted content is segmented. A playlist is created. The playlist may have at least a URI of the new DRM-based live streaming content key, an encryption method, and a list of a plurality of the encrypted segments. The URI indicates usage of a DRM key management protocol. In one embodiment, the detected parameter comprises changes in copy control information. In one embodiment, the detected parameter comprises an amount of time the previous key has been used. In one embodiment, the detected parameter comprises a program boundary.

Disclosed is a method for providing live streaming using DRM based key management via a client device. In one embodiment, a request for a playlist is sent from a media player of the client device. A playlist from a server is received at an application of the client device. The playlist has at least a Uniform Resource Identifier (URI) of a DRM-based live streaming content key, an encryption method, and a list of a plurality of encrypted content segments. The URI indicates usage of a DRM key management protocol. The DRM key management protocol is used to establish the DRM-based live streaming content key.

In one embodiment, the DRM-based live streaming content key is sent from the application of the client device to a media player of the client device using Secure Socket Layer (SSL) encryption over Secure HyperText Transfer Protocol (HTTPS). The plurality of encrypted segments is decrypted, decoded, and presented by the media player.

In one embodiment, the application decrypts the plurality of encrypted segments using the DRM-based live streaming content key to produce un-encrypted content segments. The un-encrypted content segments are sent from the application to a media player of the client device.

In one embodiment, a tune channel command is sent from a client application of the client device to a server. The tune channel command may include a channel identifier. A playlist URI is received from the server. After establishing the DRM-based live streaming content key, a temporary Rights Data File that includes a subkey used to derive the content decryption key is stored. The playlist is parsed to determine an applied encryption type.

In one embodiment, the plurality of encrypted content segments is decrypted. A new playlist is generated for the media player with an encryption method set to none and having no key URI. The new playlist is presented to the media player.

In one embodiment, a format of the DRM-based live streaming content key is changed to match a media player of the client device. A new playlist is generated for the media player. The new playlist may include the applied encryption type with a key uniform resource locator (URI) pointed to a local Secure HyperText Transfer Protocol (HTTPS) server embedded within the client application. The new playlist is presented to the media player.

In one embodiment, a playlist is received from a server in response to the server changing the content encryption key. The playlist may have at least a URI of a new DRM-based live streaming content key, an encryption method, and a list of a plurality of encrypted content segments. The URI indicates usage of a DRM key management protocol. A key exchange protocol is performed with the server under the indicated DRM key management system to establish the new key. A temporary Rights Data File that includes a subkey used to derive the new decryption key is stored. The playlist is parsed to determine an applied encryption type.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
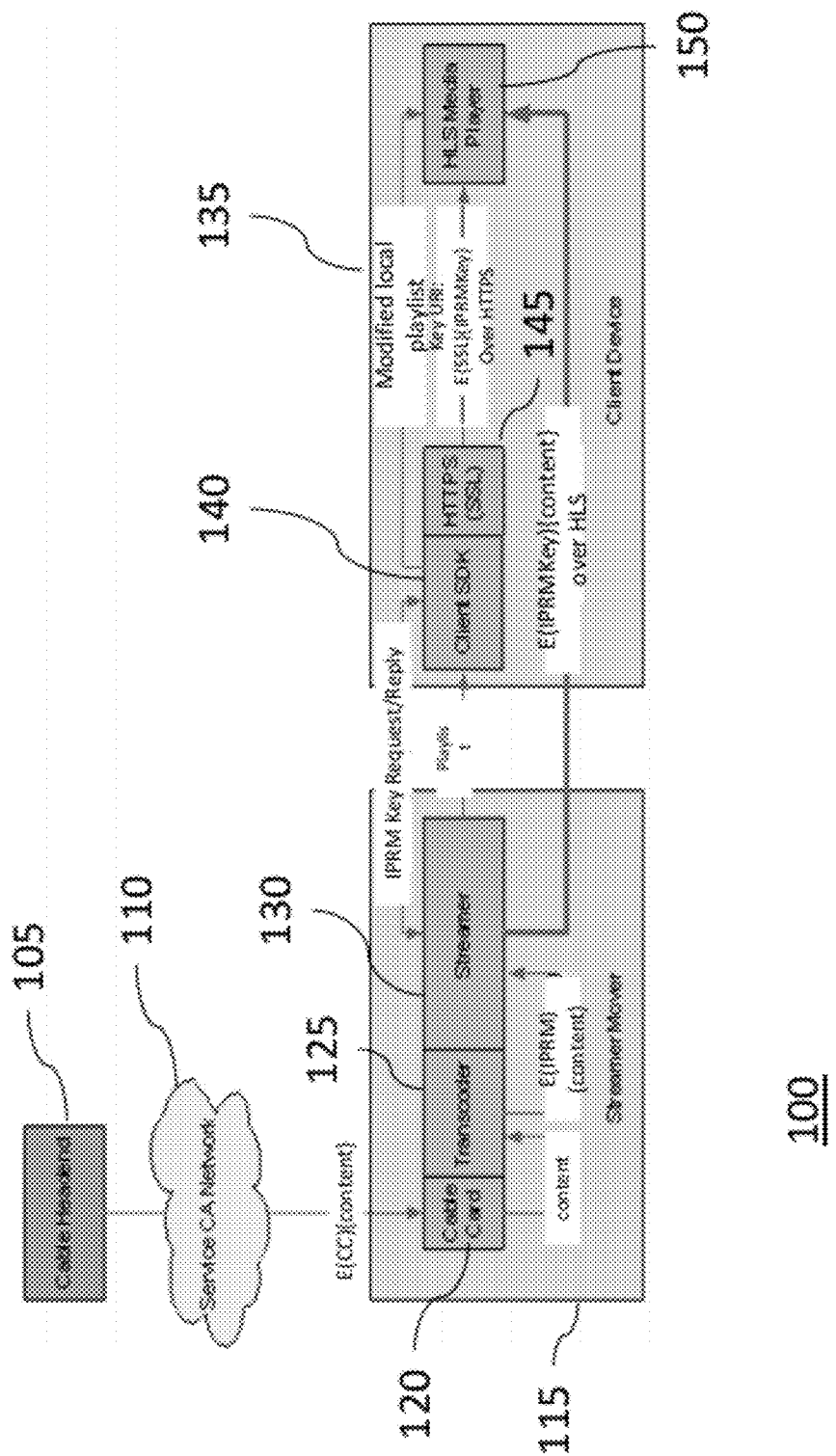
FIG. 1 illustrates one embodiment of a system 100, according to one embodiment.

The following disclosure describes DRM, e.g., Internet Protocol Rights Management (IPRM), media protection and key change mechanism as it applies to HLS. This disclosure explores how different protection modes are supported and how key change occurs as content travels from a streamer to client devices.

In the present disclosure, the main idea is to use a DRM, e.g., IPRM, system to deliver media content keys to the player device in the live streaming environment and take advantage of all DRM related functionalities that come with it, such as proximity control, copy protection enforcement and rights verification. With IPRM a content key seed is securely delivered to the player with additional data to locally derive a content decryption key while preserving and binding copy control information (CCI) and other rights data with the content decryption key.

IPRM key change is signaled by HLS key File URI changes in the Playlist. Every time IPRM detects a rule change that results in deriving a new encryption key, a new key file URI is created in the playlist so that the HLS client device gets the correct key. There are at least two key change events: One at any channel change event, and another one when CCI/rights data of incoming streams change during viewing of a channel. The key URI in this case is constructed as follows:
URI=?iprm:////KeyID.txt?
where KeyID represents an Odd/Even key tag or sequential numeric key tag. Key tags such as KeyID are used so that the client device knows which key to request for which content chunk, e.g., segment. There may also be a home server name, e.g., home gateway device, or over-the-top server name prefixed to the uniform resource locator (URL). A key URI may in this instance be constructed as follows:
URI=iprm://<Streamer Domain Name or IP Address>/channel-keyID.txt
where key segments are signaled by different keyIDs.

The encryption method that is used by live streaming can also be configured and signaled to the player device and is not limited to the Advanced Encryption Standard 128 bit Cypher Block Chaining (AES-128 CBC) described in the Internet Engineering Task Force (IETF) draft HLS specification. If the media content is for example already encrypted using AES-128 Electronic Code Book (ECB) and encapsulated inside a Motion Picture Experts Group Phase 2 (MPEG-2) transport stream, there is no need for re-encryption to AES-128 CBC of the entire content stream. Rather, the live streaming playlist file, e.g., a manifest file, can signal an Advanced Encryption Standard 128 bit Electronic Code Book MPEG-2 Transport Stream (AES-128 ECB-MP2TS) method via its key tag. The IPRM system at the client device side determines an encryption type and using DRM-based methods, acquires keys using information received from the server in a uniform resource identifier (URI). Using AES-128 ECB-MP2TS encryption in this manner allows for the support of existing DVR boxes and home media server devices, where MPEG-2 transport is commonly used.

Use of the key URI to indicate Odd/Even key usage or sequential numeric key usage is signaled by the key tag in the URI. As keys and rights do not change very quickly, use of only two key URIs at any given time, e.g., in any given playlist file, is sufficient to indicate Odd and Even key usage. In one embodiment, the key URI, or a small portion of it, with key tag inside the IPRM protocol Digital Object Identifier (DOI) object is sent as part of key request message from a client device to a server device.

FIG. 1 illustrates a system 100 for providing DRM-based live streaming. In this embodiment, AES-128 CBC encryption is used to encrypt the live stream. Streamer 115 supports tuning to live channels, transcoding in real-time and streaming the transcoded media content to a client device 135 using HLS. Streamer 115 may also be referred to as a tuner streamer or simply, a server. Incoming live media to streamer 115 is either protected by a CableCard or MediaCipher protection system from a CA provider network. The content flows thru CableCard interface 120 where the content is decrypted. The content is then transcoded in real-time by transcoder 125. The content is then re-encrypted using a DRM-based live streaming content key by transcoder 125, for protection between streamer 130 and client device 135. The streamer 130 then establishes an HLS session with client devices 135 to stream the encrypted media. The encrypted content is segmented, e.g. by streamer 130. Different keys and different CCI rights may be associated with each segment.

A playlist is created by streamer 130 of server 115. The playlist has at least a URI of a DRM-based live streaming content key, an encryption method, and a list of a plurality of the encrypted content segments. The URI also indicates usage of a DRM key management protocol. As described earlier, a URI form can be shown as:

URI=?iprm:////KeyID.txt?

The iprm: portion indicates the protocol type, i.e. the usage of a DRM key management protocol.

The playlist is sent to client device 135. In one embodiment, the playlist is sent to an application 140 of the client device. Application 140 may be a client Software Development Kit (SDK).

The encrypted content is sent to client device 135. The encrypted content may be sent to different elements of the client device depending on the type of encryption used to deliver the content key. When AES-128 CBC encryption is used, the encrypted content is sent to a media player 150 of the client device.

A request for a playlist may be sent from media player 150 of client device 135. In response to the request, a playlist from the server, e.g. server 115 is received at an application of the client device. The playlist has at least a URI of the DRM-based live streaming content key, an encryption method, and a list of a plurality of encrypted content segments. The URI also indicates usage of a DRM key management protocol.

Client application 140 generates a new or modified playlist. This modified playlist is used to provide at least encryption and key URI information to media player 150 of client device 135. When AES-128 CBC encryption is used, client application 140 generates a playlist for the locally native HLS player, e.g. media player 150 that lists AES-128 CBC as the encryption method and the key URI pointed to a local HTTPS server 145 embedded within the client application, e.g. client SDK 140. The DRM-based live streaming content key URI is sent from application 140 to media player 150 using SSL encryption over HTTPS. In this embodiment, the plurality of encrypted segments is received from streamer 130 of server 115 by media player 150 of client device 135.

Figure 2:
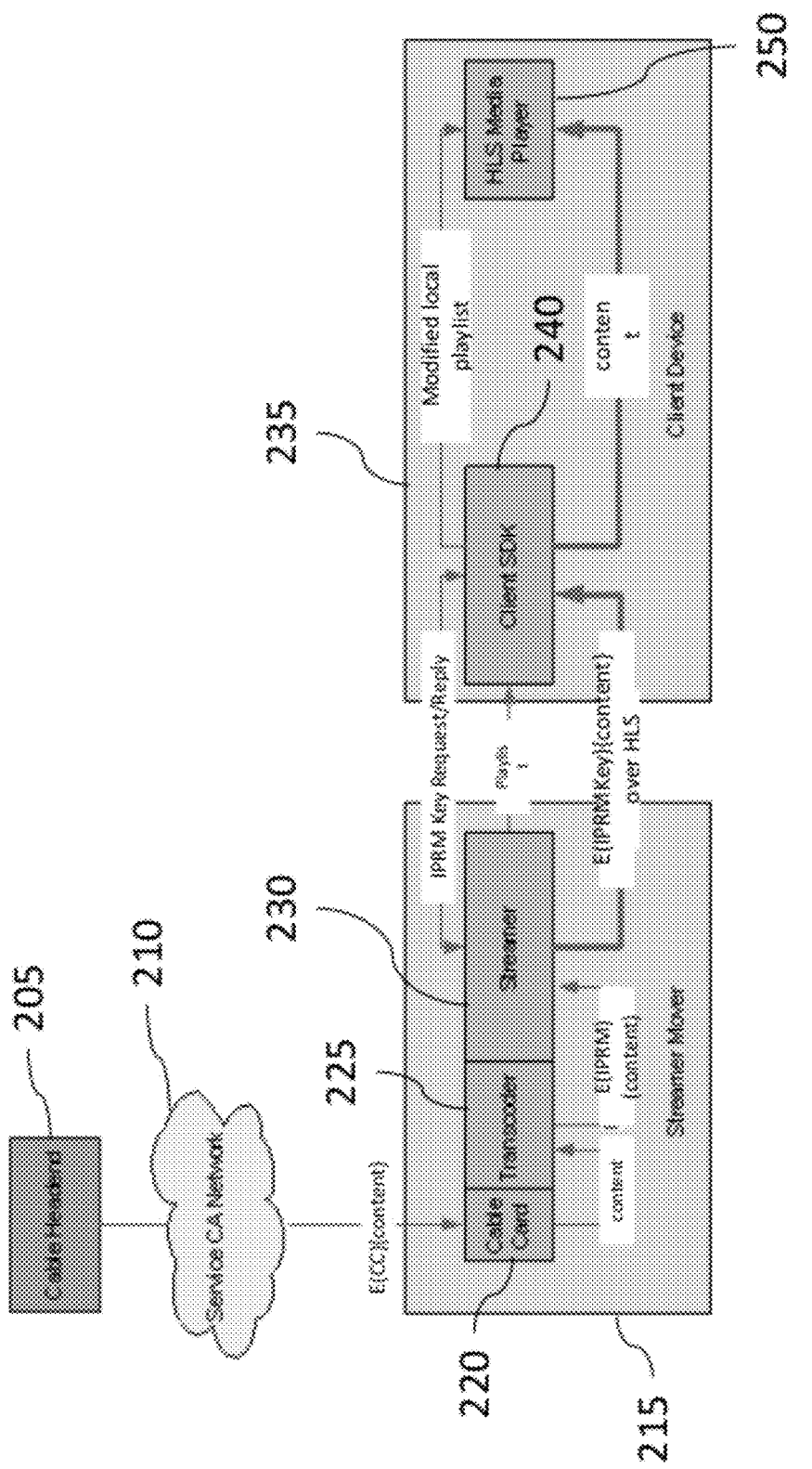
FIG. 2 illustrates one embodiment of a system 200, according to one embodiment.

FIG. 2 illustrates a system 200 for providing DRM-based live streaming. In this embodiment, AES-128 ECB MP2TS encryption is used to encrypt the live stream. Streamer 215 supports tuning to live channels, transcoding in real-time and streaming the transcoded media to client device 135 using HLS. Streamer 215 may also be referred to as a tuner streamer or simply, a server. Incoming live media to streamer 215 is either protected by a CableCard or Media Cipher protection system from a CA provider network. The content flows thru CableCard interface 220 where the content is decrypted. The content is then transcoded in real-time by transcoder 225. The content is then re-encrypted using a DRM-based live streaming content key by transcoder 225, for protection between streamer 230 and client device 235. The streamer 230 then establishes an HLS session with client devices 235 to stream the encrypted media. The encrypted content is segmented, e.g. by streamer 230. Different keys and different CCI rights may be associated with each segment.

A playlist is created by streamer 230 of server 215. The playlist has at least a URI of a DRM-based live streaming content key, an encryption method, and a list of a plurality of the encrypted content segments. The URI also indicates usage of a DRM key management protocol. The playlist is sent to client device 235. In one embodiment, the playlist is sent to an application 240 of the client device. Application 240 may be a client SDK.

The encrypted content is sent to client device 235. The encrypted content may be sent to different elements of the client device depending on the type of encryption used to deliver the content key. When AES-128 ECB MP2TS encryption is used, the encrypted content is sent to application 240 of the client device.

A request for a playlist may be sent from media player 250 of client device 235. A playlist from the server, e.g. server 215, is received at application 240. The playlist has at least a URI of the DRM-based live streaming content key, an encryption method, and a list of a plurality of encrypted content segments. The URI also indicates usage of a DRM key management protocol.

Client application 240 generates a new or modified playlist. This modified playlist is used to provide at least encryption and key URI information to media player 250 of client device 235.

When AES-128 ECB MP2TS encryption is used, client application 240 generates a playlist for the locally native HLS player, e.g. media player 250. The playlist lists NONE as the encryption method and has no key URI. In this embodiment, the plurality of encrypted segments is received from streamer 230 of server 215 by client application 240. Application 240 decodes the plurality of encrypted segments using the DRM-based live streaming content key to produce un-encoded content segments. The un-encoded content segments are sent from application 240 to media player 250 of client device 235.

Figure 3:
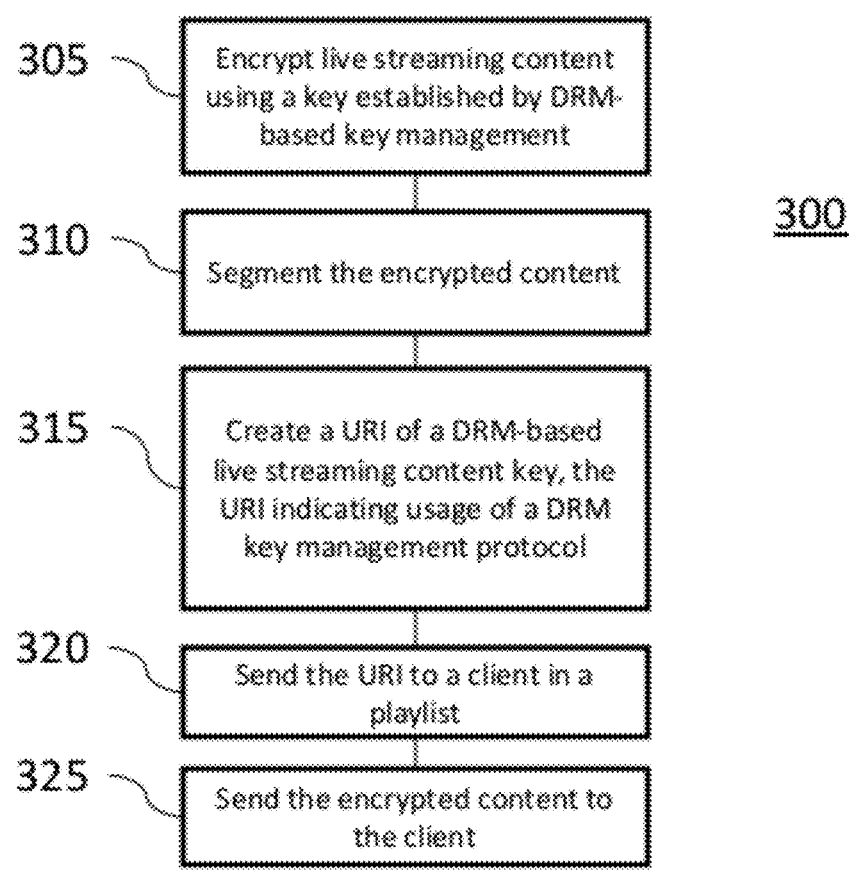
FIG. 3 illustrates one embodiment of a method 300 for providing DRM-based live streaming using a server, according to one embodiment.

FIG. 3 illustrates one embodiment of a method 300 for providing live streaming content using DRM-based key management via a server device, e.g. 115, 215. At block 305, live streaming content is encrypted using a key established by DRM-based key management. The encryption may be implemented using an IPRM DRM system that derives a DRM-based live streaming content key. The live streaming content may be encrypted by transcoder 125, 225. At block 310, the encrypted content is segmented, e.g. by streamer 130,230.

At block 315, a URI of a DRM-based live streaming content key is created. The URI indicates usage of a DRM key management protocol. At block 320, the URI is sent to client device 135, 235 in a playlist. The playlist has at least a uniform resource identifier (URI) of a DRM-based live streaming content key, an encryption method, and a list of a plurality of the encrypted content segments. In one embodiment, the playlist is sent to an application 140, 240 of client device 135, 235. Application 140, 240 may be a client SDK. The URI does not point to the actual key. The URI is an identifier the DRM system uses to find out what key is required.

At block 325, the encrypted content is sent to the client 135, 235. The encrypted content may be sent to different elements of client device 135, 235 depending on the type of encryption used to deliver the content key. When AES-128 CBC encryption is used, the encrypted content is sent to a media player 150 of the client device. When AES-128 ECB MP2TS encryption is used, the encrypted content is sent to application 240 of the client device.

Figure 4:
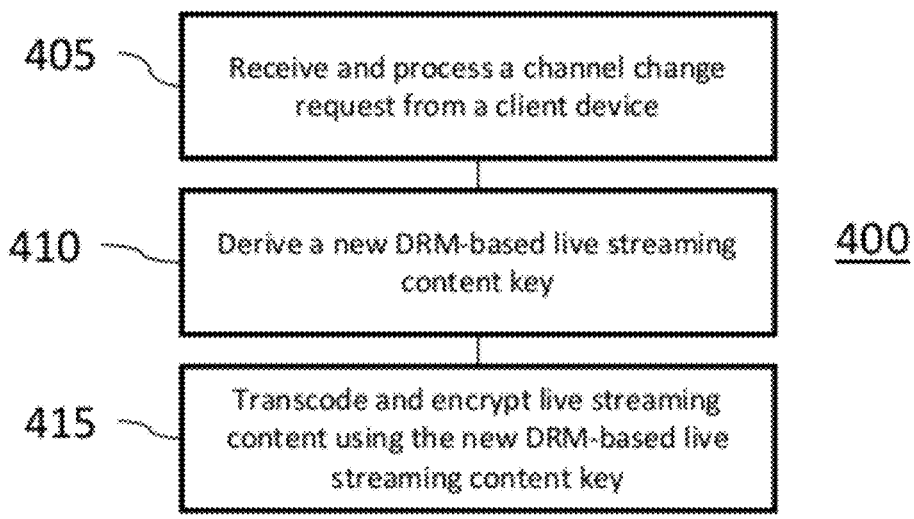
FIG. 4 illustrates one embodiment of a method 400 for providing DRM-based live streaming using a server, according to one embodiment.

FIG. 4 illustrates a method 400 for providing live streaming content using DRM-based key management via a server device. In this embodiment, the server 115, 215 implements an IPRM key change for a channel change event. Method 400 may begin at block 405 or proceed from block 325 after an initial URI has been sent to the client device 135, 235 in a playlist. At block 405, a channel change request from a client device 135, 235 is received and processed. In one embodiment, the channel change request may be a representational state transfer (RESTful) channel change request or a Digital Living Network Alliance Digital Media Server (DLNA DMS) request for content browsing. Server 115, 215 monitors CCI data to listen for changes, e.g. Cable Card or Entitlement Control Message (ECM) CCI change events. New CCI data is obtained and live streaming content is transcoded and encrypted using the new DRM-based live streaming content key. In this manner, DRM rights to the content can be verified before access is given to the content key, e.g. providing a URI for the DRM-based live streaming content key. This rights verification cannot be performed in current systems using SSL to deliver content keys.

At block 410 a new DRM-based, e.g. IPRM, live streaming content key is derived. A rights data file is created and a subkey used to derive the new DRM-based live streaming content key is stored. When using IPRM or any DRM system, the content key is derived on the client device side on the fly rather than signaling the actual key through a URI as is done in present HLS systems. Therefore, the live streaming content key is never exposed during server-client communication. At block 415, the live streaming content is transcoded and encrypted using the new DRM-based live streaming content key.

The encrypted content is segmented, e.g. by streamer 130, 230. A URI of a DRM-based live streaming content key is created. The URI indicates usage of a DRM key management protocol. The key URI provides a reference to the DRM-based live streaming content key. In one embodiment, the URI provides a reference to this key. A playlist is also created. The playlist has at least the URI of the DRM-based live streaming content key, an encryption method, and a list of a plurality of the encrypted content segments. The playlist and the encrypted content are sent to a client device, e.g. client device 135, 235. The Playlist file is created and the key URI is inserted as follows:

Add #EXT-X-KEY tag with following parameters:
METHOD=AES-128-ECB-MP2TS or AES-128
URI="iprm://<Streamer Domain Name or IP Address>/<Channel Name or ID>/channelkey.txt"
This key URI is a symbolic URI used between a streamer and a client SDK to trigger IPRM key exchange message
For example:
URI="iprm://Streamer123.mot.com/abc/channelkey.txt"

In the above #EXT-X-KEY tag example, Streamer Domain Name or IP Address could be replaced by a Home Media Gateway Device Name or IP Address instead. Likewise, Channel Name or ID could also be replaced by a digital video recorder (DVR) recoded file name or ID.

Figure 5:
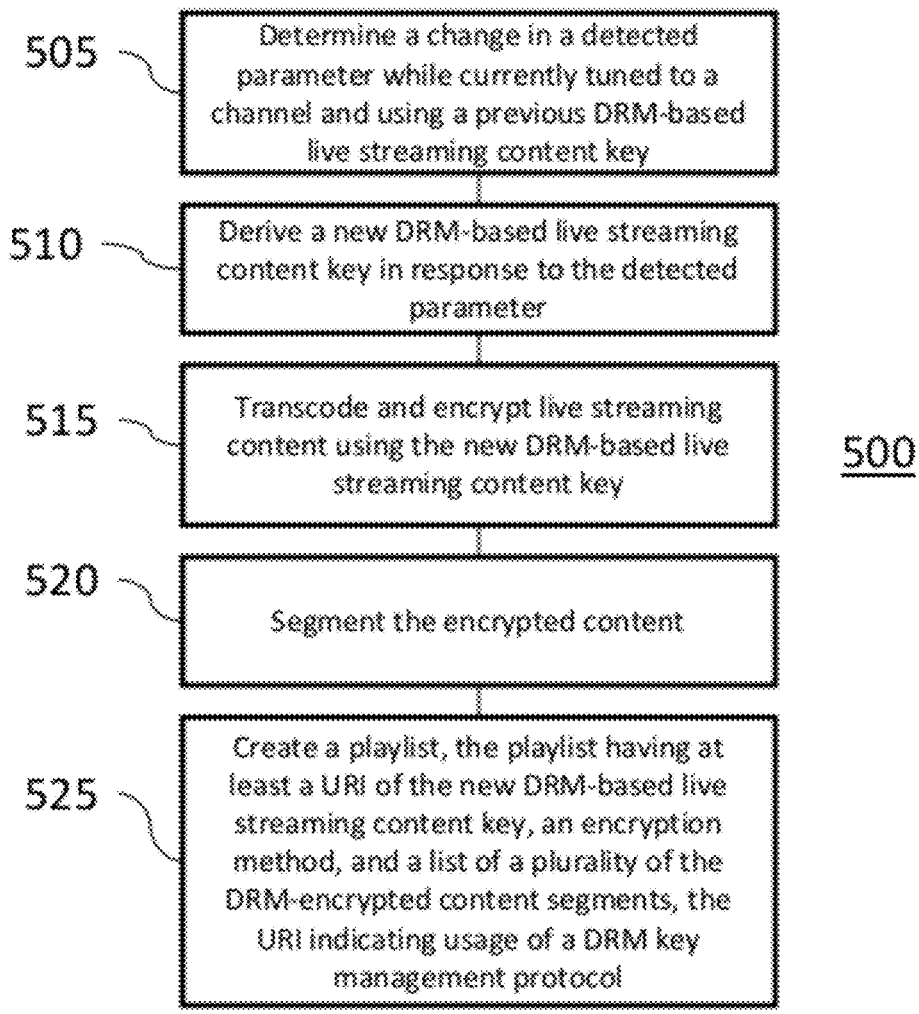
FIG. 5 illustrates one embodiment of a method 500 for providing DRM-based live streaming using a server, according to one embodiment.

FIG. 5 illustrates a method 500 for providing live streaming content using DRM-based key management via a server device. In this embodiment, the server 115, 215 implements a DRM, e.g., IPRM, key change upon determining a detected event. Method 500 may begin at block 505, proceed from block 325 after an initial URI has been sent to the client device 135, 235 in a playlist, or proceed from block 425 after a new URI has been sent to client device 135, 235 in a playlist in response to a channel change. At block 505, a change in a detected parameter is determined while currently tuned to a channel and using a previous DRM-based live streaming content key. At block 510, a new DRM-based live streaming content key is derived in response to the detected parameter. At block 515, live streaming content is transcoded and encrypted using the new DRM-based live streaming content key. At block 520, the encrypted content is segmented. At block 525, a playlist is created. The playlist has at least a URI of the new DRM-based live streaming content key, an encryption method, and a list of a plurality of the encrypted content segments. This key URI serves as an identifier to the DRM content key and indicates usage of a DRM key management protocol. The playlist and the encrypted content are sent to a client device, e.g. client device 135, 235.

In one embodiment, the detected parameter is changes in CCI. In one embodiment, the detected parameter is an amount of time the previous key has been used. In one embodiment, the detected parameter is a program boundary.

The key change, e.g. key rotation, may happen while tuned to a channel but each program within the same channel has different key or CCI data therefore has to be encrypted with different key. All media content of the same channel may be encrypted using the same key, or new keys may be required at intervals or special events such as CCI changes. According to HLS specification, the theoretical limit is one key per media file, but because each media key adds a file request and transfer to the overhead for presenting the following media segments, changing to a new key periodically is less likely to impact system performance than changing keys for each segment.

The key change signal in HLS is similar to a key URI change in a playlist file. The key change trigger point for streamer 115, 215 is when an incoming live stream has new CCI data detected by Cable Card or ECM. The sequence of operations shown for key change at the channel change event in the previous section is also applicable here with the following extra steps of detecting CCI changes in the middle of channel and by creating playlist with new key URIs every time that happens:

Streamer, e.g. streamer 115, 215, derives a new key every time CCI change is detected
Streamer also sets the new key into the hardware to start encrypting the incoming live stream
Streamer generates a new key URI (called program key here) in the playlist file every time CCI changes. For instance:
Key1: URI="iprm://Streamer123.mot.com/abc/programkey1.txt"
Key2: URI="iprm://Streamer123.mot.com/abc/programkey2.txt"
Key3: URI="iprm://Streamer123.mot.com/abc/programkey3.txt"

Figure 6:
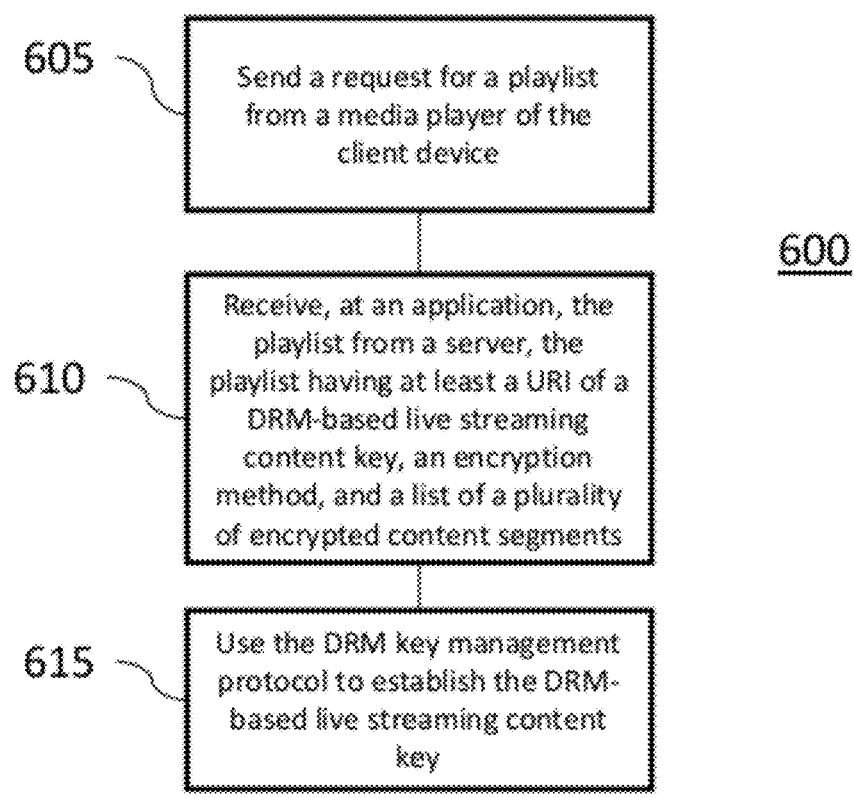
FIG. 6 illustrates one embodiment of a method 600 for providing DRM-based live streaming using a client device, according to one embodiment.

FIG. 6 illustrates one embodiment of a method 400 for providing live streaming content using DRM based key management via a client device, e.g. client device 135, 235. At block 605, a request for a playlist is sent from a media player, e.g. media player 150, 250 of the client device. At block 610, the playlist from the server, e.g. server 115, 215, is received at an application, e.g. 140, 240 of the client device. The playlist has at least a URI of the DRM-based live streaming content key, an encryption method, and a list of a plurality of encrypted content segments. The URI indicates usage of a DRM key management protocol. At block 615, the DRM key management protocol is used to establish the DRM-based live streaming content key. The IPRM protocol uses a security protocol to authenticate a client device with a streamer, e.g. server. The client device uses a key request message to request for a content key from the server. Once a key reply message is returned to the client device, the client device uses a sub-key communicated from the server and other data such as CCI from the message to create a local rights data file, and derive the actual content key in use.

When AES-128 CBC encryption is used, client application 140 generates a playlist for the locally native HLS player, e.g. media player 150 that lists AES-128 CBC as the encryption method and the key URI pointed to a local HTTPS server 145 embedded within the client application, e.g. client SDK 140. The DRM-based live streaming content key is sent from application 140 to media player 150 using SSL encryption over HTTPS. In this embodiment, the plurality of encrypted segments is received from streamer 130 of server 115 by media player 150 of client device 135. The plurality of encrypted segments is decrypted, decoded, and presented by the media player.

When AES-128 ECB MP2TS encryption is used, client application 240 generates a playlist for the locally native HLS player, e.g. media player 250. The playlist lists NONE as the encryption method and has no key URI. In this embodiment, the plurality of encrypted segments is received from streamer 230 of server 215 by client application 240. Application 240 decrypts the plurality of encrypted segments using the DRM-based live streaming content key to produce un-encrypted content segments. The un-encrypted content segments are sent to media player 250 by application 240.

Figure 7:
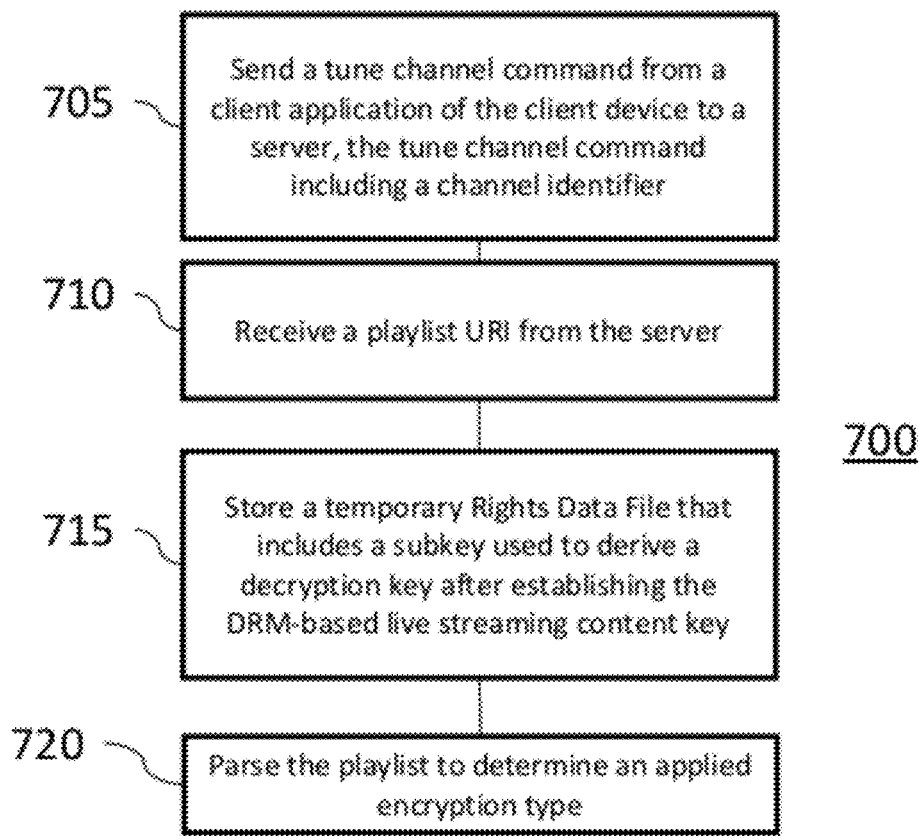
FIG. 7 illustrates one embodiment of a method 700 for providing DRM-based live streaming using a client device, according to one embodiment.

FIG. 7 illustrates a method 700 for providing live streaming content using DRM-based key management via a client device. In this embodiment, the client device 135, 235 implements a DRM-based, e.g. IPRM, key change for a channel change event. An application (not shown) on the client device initiates a channel change and calls a client SDK 140, 240 tune channel API. Method 700 may start at block 705 or proceed from block 615, after an initial key has been derived. At block 705, a tune channel command is sent from a client application 140, 240 of the client device 135, 235 to a server, e.g. streamer 115, 215. The tune channel command may be a representational state transfer (RESTful) command or a Digital Living Network Alliance Digital Media Server (DLNA DMS) command for content browsing. The RESTful command may include at least a channel identifier. At block 710, a playlist URI is received from the server, e.g. from streamer 130, 230.

The IPRM application, e.g. client SDK 140, 240, on the client device performs key exchange using the channel name or channel ID with the IPRM application on the streamer 130, 230. At block 715, a temporary Rights Data File that includes a subkey used to derive the content decryption key is stored by the IPRM application after establishing the DRM-based live streaming content key.

At block 720, the playlist is parsed to determine an applied encryption type. The behavior of the client SDK depends on the content encryption method/type indicated in the HLS playlist.

AES-128 EBC MP2TS encryption is specific to IPRM and is not currently supported by any standard HLS server or player. Therefore, the decryption has to happen outside the HLS player and within the client SDK. The clear media content, e.g. un-encrypted media content, is sent from the client SDK to the media player. The HLS player, in this case treats the incoming stream as clear without a key URI in the playlist.

When AES-128 EBC MP2TS is the applied encryption type, the client SDK 240 decrypts the plurality of encrypted content segments. IPRM decrypts the content and provides a clear buffer to client SDK 240. Client SDK 240 sends the buffer to media player 250, e.g. a native HLS player, of client device 235. A new playlist is generated for the media player with an encryption method set to none and having no key URI. The new playlist is presented by the client SDK 240 to the HLS player 250.

AES-128 CBC mode decryption is supported by a native HLS player, e.g. media player 150 as long as the key URI is securely presented to the native HLS player. When AES-128 CBC encryption is the applied encryption type, a format of the DRM-based live streaming content key is changed to match the media player of the client device. The HLS key provided to media player 150 by HTTPS server 145 is an AES-128 key that is 16-octet keys. The format of the Key file is simply a packed array of these 16 octets in binary format. The key value must be interpreted as a 128-bit hexadecimal number and must be pre-fixed with 0x or 0X.

A new or modified playlist is generated for the media player 150. The new playlist includes the applied encryption type with a key URI pointed to a local HTTPS server embedded within the client application 140. The client SDK presents the new playlist to the media player.

The #EXT-X-KEY tag in the new playlist must be as follows:
METHOD=AES-128
URI="https://localhost/<Channel Name or ID>/channelkey.txt"
For example:
URI="https://localhost/abc/channelkey.txt"

HLS player 150 gets the new or modified playlist file from client SDK 140. When AES-128-ECB-MP2TS encryption is used, the HLS player 250 gets clear (un-encrypted) media and renders the media. When AES-128 CBC is used, player 150 gets encrypted media, decrypts the media using the key URI and renders the media.

Figure 8:
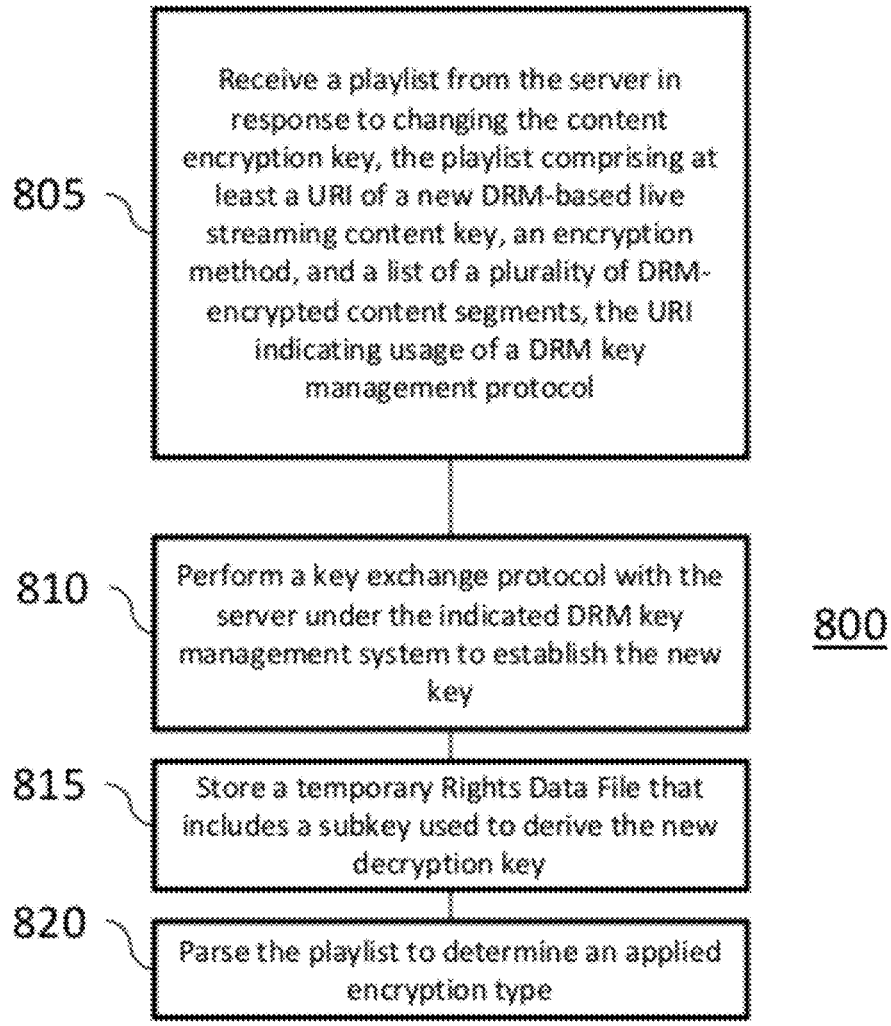
FIG. 8 illustrates one embodiment of a method 800 for providing DRM-based live streaming using a client device, according to one embodiment.

FIG. 8 illustrates a method 800 for providing live streaming content using DRM-based key management via a server device. In this embodiment, the server 115, 215 implements an IPRM key change in response to a detected parameter. The detected parameter may be a program boundary, an amount of time a previous key has been used, or a CCI change event. Method 800 may begin at block 805, proceed from block 615, after an initial key has been derived, or block 730, after a key has been derived in connection with a channel change. At block 805, a playlist is received from the server 115, 215 in response to the server changing the content encryption key. The playlist has at least a URI of a new DRM-based live streaming content key, an encryption method, and a list of a plurality of encrypted content segments. The URI indicates usage of a DRM key management protocol.

At block 810, a key exchange protocol is performed with the server under the indicated DRM key management system to establish the new key. In one embodiment, the IPRM application, e.g. client SDK 140, 240, on the client device performs key exchange using the URI information to identify the key of interest with the IPRM application on the streamer 130, 230. At block 815, a temporary Rights Data File that includes a subkey used to derive the new decryption key is stored by the IPRM application.

At block 820, the playlist is parsed to determine an applied encryption type. The behavior of the client SDK depends on the content encryption method/type indicated in the HLS playlist.

AES-128 EBC MP2TS encryption is specific to IPRM and is not currently supported by any standard HLS server or player. Therefore, the decryption has to happen outside the HLS player, e.g. media player 250, and within the client SDK, 240. The clear media content, e.g. un-encrypted media content, is sent from client SDK 140 to media player 250. The HLS player, in this case treats the incoming stream as clear without a key URI in the playlist. When AES-128 EBC MP2TS is the applied encryption type, the client SDK 240 decrypts the plurality of encrypted content segments. IPRM is used to decrypt the content and provide a clear buffer to client SDK 240. Client SDK 240 sends the buffer to media player 250, e.g. a native HLS player, of client device 235. A new or modified playlist is generated for the media player with an encryption method set to none and having no key URI. The new playlist is presented by the client SDK 240 to the HLS player 250.

AES-128 CBC mode decryption is supported by a native HLS player as long as the key URI is securely presented to the native HLS player, e.g. player 150. When AES-128 CBC encryption is the applied encryption type, the DRM-based live streaming content key is established. A format of the DRM-based live streaming content key is changed to match the media player of the client device. The HLS key provided to media player 150 by HTTPS server 145 is an AES-128 key that is 16-octet keys. The format of the Key file is simply a packed array of these 16 octets in binary format. The key value must be interpreted as a 128-bit hexadecimal number and must be pre-fixed with 0x or 0X.

A new playlist, e.g. modified playlist, is generated for the media player 150. The new playlist includes the applied encryption type with a modified key URI for program keys. The client SDK presents the new playlist to the media player.

The modified key URI may be as follows:
Key1: URI="https://localhost/abc/programkey1.txt"
Key2: URI="https://localhost/abc/programkey2.txt"
Key3: URI="https://localhost/abc/programkey3.txt"

The programKey n field in the URI above is just an indicator of subsequent key changes due to either new CCI, a long elapsed time of usage for the prior key, or some other detected program parameter change. The programKey n field can also be a fixed name with a strictly sequential number to show the key changes across all usage scenarios. Thus tuning to channel 1 would show a "keyname1" then a new tuned channel would use "keyname2" then a CCI change on that channel would go to "keyname3" and so on. The field just needs to be explicit enough that client devices can establish the correct key. Another option is to use "keyname1" then "keyname2" then back to "keyname1" and so on, essentially odd and even key names forever. This option is also effective, even though all the referenced keys would be different, so long as the keys do not change very often.

HLS player 150 gets the new or modified playlist file with the modified key URI from client SDK 140. When AES-128-ECB-MP2TS encryption is used, the HLS player 250 gets clear (un-encrypted) media and renders the media. When AES-128 CBC is used, player 150 gets encrypted media, decrypts the media using the modified key URI and renders the media.

IPRM currently supports AES-128 ECB mode for MPEG-2 Transport Streams. HLS, in addition to supporting clear content only supports AES-128 with CBC mode for encryption.

For an encryption method/mode of 'NONE', there is no encryption signal and there should be no key file associated with this method. The media file following this tag is in clear.

HLS currently only supports one encryption method. This supported encryption method is AES-128 CBC. The decryption type is signaled in the playlist with URI to key file. The native client device HLS player obtains the key and decrypts the encrypted live streaming content. The following rules apply to AES-128 CBC encryption:

Individual media files or chunks must be encrypted in entirety and Cipher Block Chaining must not be applied across different media files;
The initialization vector (IV) used for encryption and decryption must be either the sequence number of the media file or the value of the IV attribute of the EXT-X-KEY tag. The EXT-X-KEY tag contains information to decrypt media files that follow it.

AES-128 ECB MP2TS is a new proposed method to HLS in order to support IPRM encrypted MP2TS packets using AES-128 ECB mode. Since this is an IPRM specific mode, the native client device platform HLS player does not support this mode and packets need to be decrypted before getting to the player. The playlist should be tagged with encryption METHOD of NONE while being presented to the player.

The AES-128 ECB MP2TS encryption method used by IPRM server follows these rules:

The 4-byte TS packet header is in the clear and the transport_scrambling_control bit is set if payload is encrypted;
If there is an adaptation field, it is left in the clear;
Only payloads longer than 15 bytes are encrypted using the 128-bit AES ECB mode with a 128-bit key, block by block;
Null packet and those packets whose payload is less than 16 bytes long are left in clear; and
If there is a residual block, it is also left in clear.

The following highlights key exchange elements of HLS playlists as discussed in this disclosure in sample playlist files and their corresponding modifications on the streamer and client device. This sample shows m3u8 playlist file as the client device tunes to channel 701. In each of the following examples there is a media sequence (541), a target duration (2), an encryption method, a URI and a list of content segments (#EXTINF:2). The URI references a LocalServerFQDN. An FQDN refers to a Fully Qualified Domain Name 1. Streamer to Client Device with AES-128-ECB-MP2TS

```
#EXTM3U
#EXT-X-MEDIA-SEQUENCE:541
#EXT-X-TARGETDURATION:2
#EXT-X-ALLOW-CACHE:NO
#EXT-X-KEY:METHOD=AES-128-ECB-MP2TS,URI="iprm://LocalServerFQDN /content/701/channelkey.txt"
#EXTINF:2,
http://LocalServerFQDN /content/701_00541.ts
#EXTINF:2,
http://LocalServerFQDN /content/701_00542.ts
#EXTINF:2,
http://LocalServerFQDN /content/701_00543.ts
```

2. Client SDK to Player with AES-128-ECB-MP2TS

```
#EXTM3U
#EXT-X-MEDIA-SEQUENCE:541
#EXT-X-TARGETDURATION:2
#EXT-X-ALLOW-CACHE:NO
#EXT-X-KEY:METHOD=NONE
#EXTINF:2,
http://LocalServerFQDN /content/701_00541.ts
#EXTINF:2,
http://LocalServerFQDN /content/701_00542.ts
#EXTINF:2,
http://LocalServerFQDN /content/701_00543.ts
```

3. Streamer to Client Device with AES-128

```
#EXTM3U
#EXT-X-MEDIA-SEQUENCE:541
#EXT-X-TARGETDURATION:2
#EXT-X-ALLOW-CACHE:NO
#EXT-X-KEY:METHOD=AES-128,URI="iprm://LocalServerFQDN
/content/701/channelkey.txt"
```

-continued

```
#EXTINF:2,
http://LocalServerFQDN /content/701_00541.ts
#EXTINF:2,
http://LocalServerFQDN /content/701_00542.ts
#EXTINF:2,
http://LocalServerFQDN /content/701_00543.ts
```

4. Client SDK to Player with AES-128

```
#EXTM3U
#EXT-X-MEDIA-SEQUENCE:541
#EXT-X-TARGETDURATION:2
#EXT-X-ALLOW-CACHE:NO
#EXT-X-KEY:METHOD=AES-
128,URI="https://localhost/content/701/channelkey.txt"
#EXTINF:2,
http:// LocalServerFQDN /content/701_00541.ts
#EXTINF:2,
http:// LocalServerFQDN /content/701_00542.ts
#EXTINF:2,
http:// LocalServerFQDN /content/701_00543.ts
```

Figure 9:
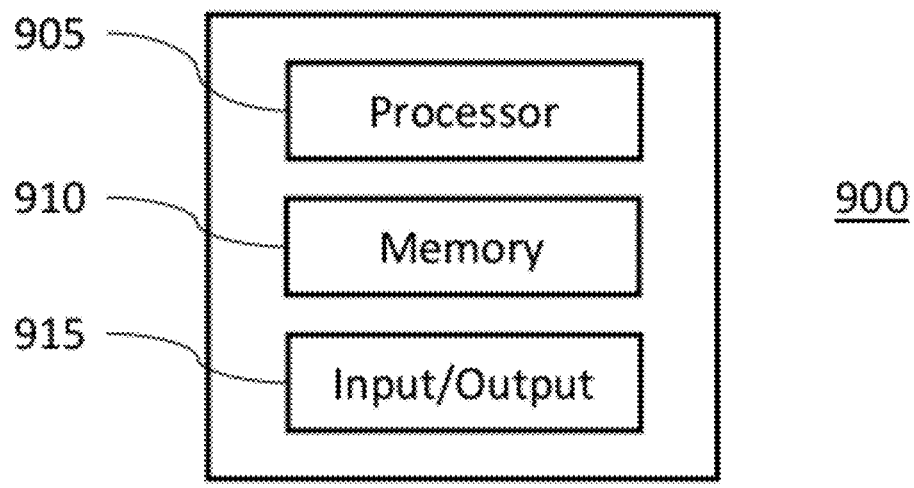
FIG. 9 illustrates a server device 900, according to one embodiment.
Figure 10:
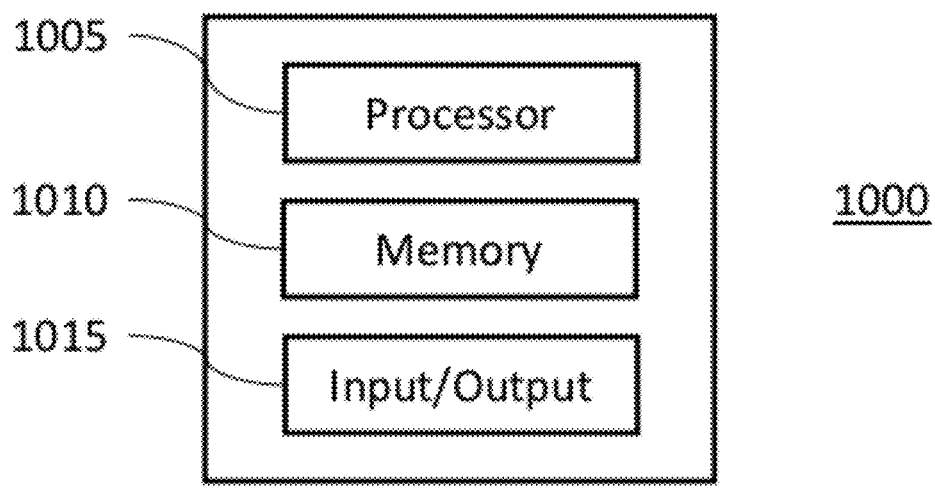
FIG. 10 illustrates an end-user device 1000, according to one embodiment.

FIG. 9 and FIG. 10 illustrate an example server device 900 and end-user device 1000. Server device 900 may be implemented as streamer 115, 215. Device 900 comprises a processor (CPU) 905, a memory 910, e.g., random access memory (RAM) and/or read only memory (ROM), and various input/output devices 915, (e.g., storage devices, including but not limited to, a tape drive, a floppy drive, a hard disk drive or a compact disk drive, a receiver, a transmitter, and other devices commonly required in multimedia, e.g., content delivery, encoder, decoder, system components, Universal Serial Bus (USB) mass storage, network attached storage, storage device on a network cloud).

End-user device 1000 may be implemented as client device 135, 235. Device 1000 comprises a processor (CPU) 1005, a memory 1010, e.g., random access memory (RAM) and/or read only memory (ROM), and various input/output devices 1015, (e.g., storage devices, including but not limited to, a tape drive, a floppy drive, a hard disk drive or a compact disk drive, a receiver, a transmitter, and other devices commonly required in multimedia, e.g., content delivery, encoder, decoder, system components, Universal Serial Bus (USB) mass storage, network attached storage, storage device on a network cloud).

The processes described above, including but not limited to those presented in connection with FIGS. 1-8, may be implemented in general, multi-purpose or single purpose processors. Such a processor, e.g. processor 905, 1005, will execute instructions, either at the assembly, compiled or machine-level, to perform that process. Those instructions can be written by one of ordinary skill in the art following the description of presented above and stored or transmitted on a computer readable medium, e.g., a non-transitory computer-readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

While the foregoing is directed to embodiments of the present disclosure, other and further embodiments may be devised without departing from the basic scope thereof, and the scope thereof is determined by the claims that follow.

What is claimed is:

1. A method for providing live streaming content using Digital Rights Management (DRM) based key management via a server device, the method comprising:
   encrypting, by the server device comprising a processor, live streaming content using a key established by the DRM-based key management;
   segmenting the encrypted live streaming content;
   creating a uniform resource identifier (URI) of a DRM-based live streaming content key, the URI indicating usage of a DRM key management protocol;
   sending the URI to a client device in a playlist sent to an application of the client device; and
   sending the encrypted live streaming content to the client device, wherein the server device is configured to perform operations comprising:
      receiving and processing a channel change request from the client device; and
      deriving a first new DRM-based live streaming content key based, at least, in part, on a change in content control copy information associated with the channel change request.

2. The method of claim 1, wherein the encrypted live streaming content is sent to a media player of the client device in response to Advanced Encryption Standard 128-bit Cypher Block Chaining (AES 128 CBC) being employed for the encryption.

3. The method of claim 1, wherein the encrypted live streaming content is sent to the application of the client device in response to Advanced Encryption Standard 128-bit Electronic Code Book (AES 128 ECB) MPEG 2 Transport Stream (MP2TS) encryption being employed.

4. The method of claim 1, wherein the receiving and the processing a channel change request from the client device further comprises:
   monitoring the content copy control information (CCI) to listen for changes; and
   obtaining new CCI data; and
   transcoding and encrypting the live streaming content using the first new DRM-based live streaming content key.

5. The method of claim 1, wherein the deriving the first new DRM-based live streaming content key further comprises:
   creating a rights data file and storing a subkey used to derive the new DRM-based live streaming content key in the rights data file.

6. The method of claim 5, further comprising:
   determining a change in a detected parameter while currently tuned to a channel and using the DRM-based live streaming content key;
   deriving a second new DRM-based live streaming content key in response to the detected parameter;
   transcoding and encrypting live streaming content using the second new DRM-based live streaming content key;
   segmenting the encrypted live streaming content; and
   creating another playlist comprising at least a second URI associated with the second new DRM-based live streaming content key.

7. The method of claim 6, wherein the detected parameter comprises a change in copy control information.

8. The method of claim 6, wherein the detected parameter comprises an amount of time the DRM-based live streaming content key has been used.

9. The method of claim 6, wherein the detected parameter comprises a program boundary.

10. The method of claim 1, wherein the URI provides a reference to the DRM-based live streaming content key.

11. A method for providing live streaming using Digital Rights Management (DRM) based key management via a client device, the method comprising:
sending, by the client device comprising a processor, a request for a playlist from a media player of the client device;
receiving the playlist, at an application of the client device, from a server, the playlist comprising at least a Uniform Resource Identifier (URI) of a DRM-based live streaming content key, an encryption method, and a list of a plurality of encrypted content segments, the URI indicating usage of a DRM key management protocol;
using the DRM key management protocol to establish the DRM-based live streaming content key;
sending a tune channel command from a client application of the client device to a server;
receiving a playlist URI from the server;
storing, after establishing the DRM-based live streaming content key, a temporary rights data file that includes a subkey used to derive a content decryption key; and
parsing the playlist to determine an applied encryption type.

12. The method of claim 11, wherein the DRM-based live streaming content key is sent from the application of the client device to the media player of the client device using Secure Socket Layer (SSL) encryption over Secure HyperText Transfer Protocol (HTTPS).

13. The method of claim 12, wherein the plurality of encrypted segments are decrypted, decoded, and presented by the media player.

14. The method of claim 11, wherein the application decrypts the plurality of encrypted segments using the DRM-based live streaming content key to produce decrypted content segments.

15. The method of claim 14, wherein the decrypted content segments are sent from the application to the media player of the client device.

16. The method of claim 11, wherein the tune channel command includes a channel identifier.

17. The method of claim 16, further comprising:
decrypting the plurality of encrypted content segments;
generating a new playlist for the media player with an encryption method set to none and having no key URI; and
presenting the new playlist to the media player.

18. The method of claim 16, further comprising:
changing a format of the DRM-based live streaming content key to match a media player of the client device;
generating a new playlist for the media player that includes the applied encryption type with a key uniform resource locator (URI) pointed to a local Secure HyperText Transfer Protocol (HTTPS) server embedded within the client application; and
presenting the new playlist to the media player.

19. The method of claim 11, further comprising:
receiving another playlist comprising another Uniform Resource Identifier (URI) and a new DRM-based live streaming content key.

* * * * *